No. 703,587. Patented July 1, 1902.
E. D. IRWIN.
HORSE DETACHER.
(Application filed Nov. 12, 1901.)
(No Model.)
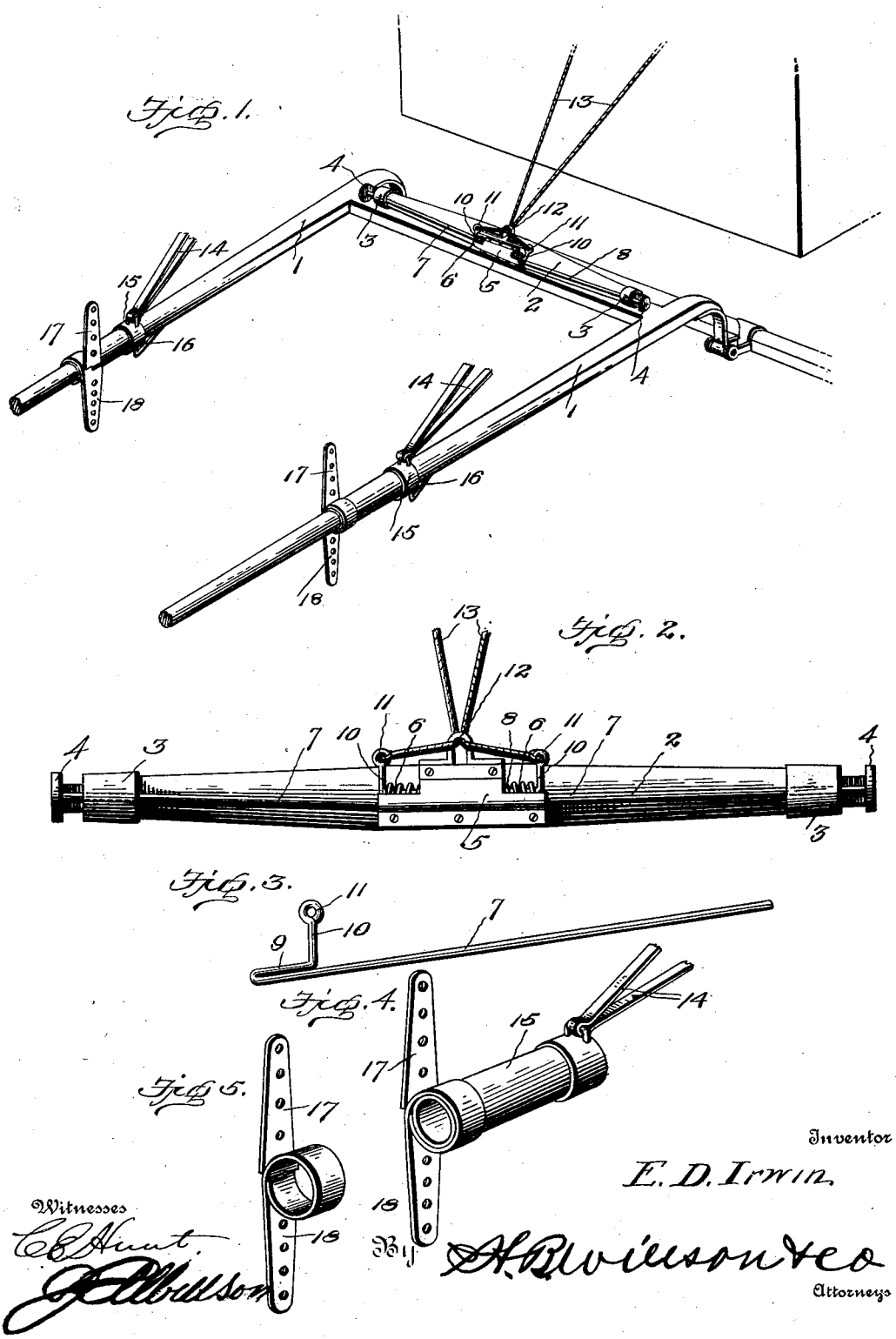
Witnesses
Inventor
E. D. Irwin
Attorneys

UNITED STATES PATENT OFFICE.

ELIJAH D. IRWIN, OF FURCHES, NORTH CAROLINA.

HORSE-DETACHER.

SPECIFICATION forming part of Letters Patent No. 703,587, dated July 1, 1902.

Application filed November 12, 1901. Serial No. 82,034. (No model.)

*To all whom it may concern:*

Be it known that I, ELIJAH D. IRWIN, a citizen of the United States, residing at Furches, in the county of Ashe and State of North Carolina, have invented certain new and useful Improvements in Horse-Detachers; and I do declare the following to be a full, clear, and exact description of the invention, such as will enable others skilled in the art to which it appertains to make and use the same.

The invention relates to horse-detachers.

The object of the invention is to provide a horse-detacher whereby in the event that the animal runs away it may be easily and quickly detached from the vehicle by the occupant thereof.

With this and other objects in view the invention consists of certain novel features of construction, combination, and arrangement of parts, which will be hereinafter more fully described, and particularly pointed out in the appended claims.

In the accompanying drawings, Figure 1 is a view illustrating the application of the invention. Fig. 2 is an enlarged front view of the singletree. Fig. 3 is a detail perspective view of one of the actuating plunger-rods. Fig. 4 is a detail view of one of the shaft-sleeves, and Fig. 5 is a similar view illustrating the manner of connecting one of the end collars thereto.

Referring to the drawings, 1 denotes the shafts of a vehicle, and 2 the singletree. The singletree is provided at its ends with collars 3, having hook-shaped stop-lips 4. 5 denotes a casing screwed or otherwise secured to the front side of the singletree, and 6 denotes a coiled spring seated in this casing.

7 denotes plunger-rods, each of which is mounted to slide in a groove 8, formed in the inner face of the casing, and has its inner end doubled upon itself, as shown at 9, and provided with an upwardly-extending post 10, formed with an eye 11. A doubled portion at the inner end of the rod is inserted into the end of the coiled spring, and the post forms a stop or abutment for the end of the spring, whereby the energy of said spring is exerted to force the outer end of the plunger-rod against the stop-lip 4.

12 denotes a loop or guide-eye secured to the upper side of the singletree at a point between the posts 10, and passing through said guide-eye are the ends of a loop or string 13, which leads to within convenient reach of the occupant of the vehicle.

It is evident that when the traces of the harness are engaged with the outwardly-projecting ends of the plunger-rods said traces will be securely attached to the singletree against accidental detachment; but should the animal run away and it be desired to separate the vehicle from the animal by pulling upon the loop or string the outer ends of the plunger-rods will be retracted from their engagement with the traces, thus allowing the animal to free himself from the vehicle and the vehicle to ultimately come to a stop.

In order to render this device particularly valuable for releasing runaway horses, the breech-strap 14 is adapted to be attached to a sleeve 15, which is preferably made of stiff leather and is provided at each end with a collar. The inner end of this breech-strap engages a bracket or stud 16, secured to the shaft, so that in holding back the strain comes upon the bracket or stud. To the inner collar of the sleeve is attached the breech-strap. The outer collar or sleeve consists of a strip of metal provided with interlocking slits, so that after the metal has been curved about the end of the sleeve and riveted thereto the interlocking slits are engaged one with the other, and the extremities 17 and 18 of the collar are then riveted to the back and belly bands of the harness. When the traces are detached from the singletree in the manner hereinbefore set forth, the sleeves will freely slip off the shafts, and thus release the animal entirely from the vehicle.

From the foregoing description, taken in connection with the accompanying drawings, the construction, mode of operation, and advantages of my invention will be readily understood without requiring a more extended explanation.

Various changes in the form, proportion, and details of construction may be made without departing from the spirit or sacrificing any of the advantages thereof.

Having thus described my invention, what I claim, and desire to secure by Letters Patent, is—

1. In a horse-detaching device, the combination with the singletree formed with grooves in its forward side, sleeves secured to the ends of the singletree and provided with stop-lips, a spring-casing secured to the forward side of the singletree and a coiled spring located within said casing, of plunger-rods mounted to slide in said grooves and through the sleeves at the ends of the singletree and having their inner ends doubled upon themselves and projecting into the ends of the coiled spring and terminating in vertical posts against which the ends of the coiled spring abut and by means of which the outer ends of said plunger-rods are adapted normally to engage the stop-lips aforesaid, and means for moving the posts toward each other, substantially as set forth.

2. In a horse-detaching device the combination with the singletree formed with grooves in its forward side, sleeves secured to the ends of the singletree and provided with stop-lips, a spring-casing secured to the forward side of the singletree, and a coil-spring located within said casing, plunger-rods mounted to slide in said grooves and through the sleeves at the ends of the singletree and having their inner ends doubled upon themselves and projecting into the ends of the coil-spring and terminating in vertical posts against which the ends of the coil-spring abut and by means of which the outer ends of said plunger-rods are adapted normally to engage the stop-lips aforesaid, and means for moving the posts toward each other; of shafts provided with stops, and sleeves having a sliding removable engagement with said shafts and adapted to contact with said stops.

In testimony whereof I have hereunto set my hand in presence of two subscribing witnesses.

ELIJAH D. IRWIN.

Witnesses:
M. B. TAYLOR,
E. W. WILLIAMS.